Inventors.
ALFRED J. WENZEL
ALWIN K. HANTEL
BY Tweedale & Gerhardt
Attorneys.

United States Patent Office 3,467,424
Patented Sept. 16, 1969

3,467,424
TWINE RETAINER FOR KNOTTER
Alfred J. Wenzel, Kassel-Kirchditmold, and Alwin K. Hantel, Kassel, Germany, assignors to Massey-Ferguson G.m.b.H., Kassel, Germany
Filed Dec. 20, 1967, Ser. No. 692,002
Claims priority, application Great Britain, Jan. 25, 1967, 3,648/67
Int. Cl. B65h 69/04
U.S. Cl. 289—13                                    9 Claims

ABSTRACT OF THE DISCLOSURE

A baling machine with a knotting mechanism that has a twine retainer with two clamping parts mounted on a shaft. A leaf spring and two compression springs urge one of the clamping parts toward the other clamping part. A cam engages a cam follower on one end of the leaf spring to apply additional force through one of the compression springs to one clamping part during the bale forming operation of each cycle to increase the clamping load of the twine retainer. The cam disengages the cam follower to decrease the clamping load of the twine retainer during knotting.

---

Figure 1:
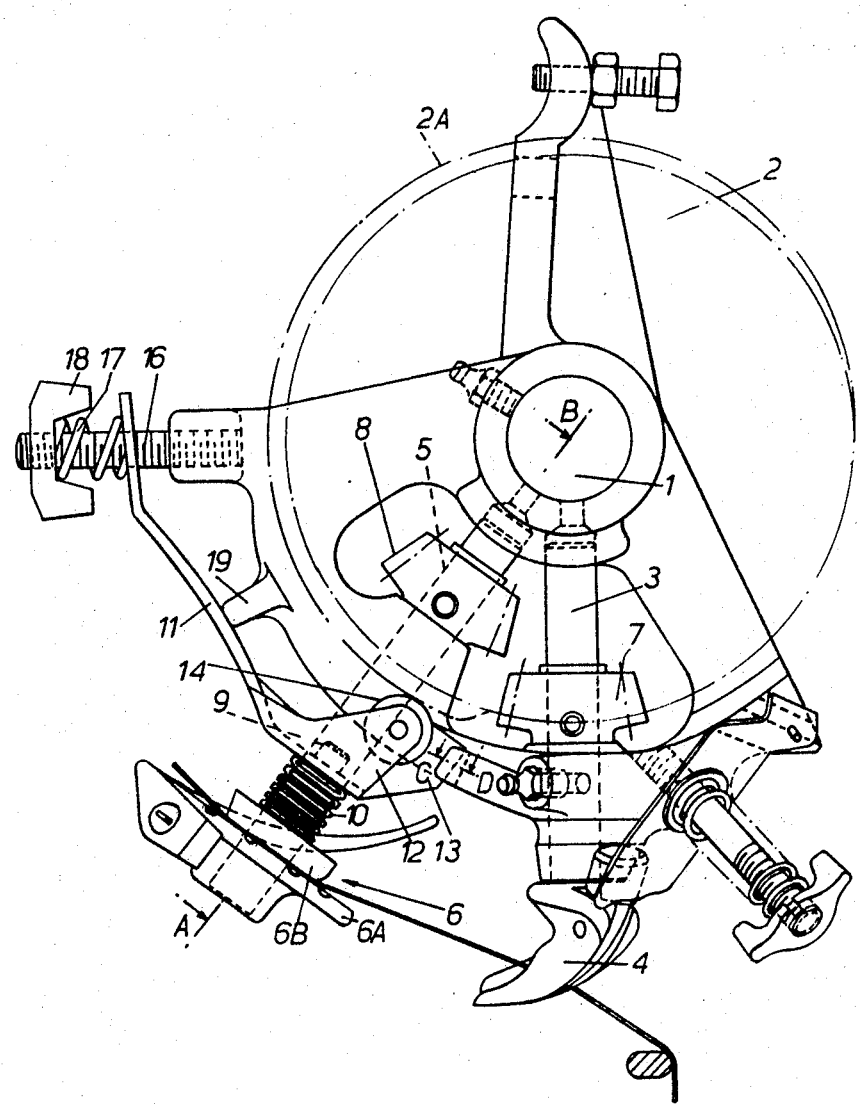

This invention relates to knotting mechanism for use in machines for forming and tying bales or sheaves of material with twine, such, for example, as hay, straw or corn, hereinafter referred to as baling machines.

Such mechanisms have twine retainers, and in order to obtain a secure knot the twine retainer should hold the twine very tightly during the bale-forming operation, so that no twine is drawn out, and should hold the twine more loosely during the knotting operation so that the twine, comparatively easily, may be drawn out of the twine retainer without breaking or fraying.

In such a mechanism previously proposed, the twine retainer is released during the tying operation by means of cams. A disadvantage of this is that the release is the same for each knot being formed. Thus, if the twine is of uneven thickness, relatively thin twine is drawn out of the twine retainer too easily and accordingly too soon, and this results in the twine not being knotted or being badly knotted. Moreover, the cams are not adjustable and, therefore, wear on them leads to more and more diminishing release of the twine retainer, so that the desired effect is lost.

Proposals have been made to overcome or reduce the disadvantage aforesaid, but the resultant mechanism is complicated and expensive, involving a large number of extra parts which are exposed to heavy wear. Moreover, it is difficult to adjust those parts to the required operating conditions, since at least two screws have to be controlled in each knotting mechanism, and the operator cannot know which screw is to be tightened more and which less, so that, in consequence of a wrong control, no knots or badly tied knots may result.

An object of the present invention is to provide a knotting mechanism with a controlled load on the twine retainer and which, relatively, is simple and easy to make, consists of few parts, is inexpensive, the number of wearing parts is reduced, and is adjustable to suit different operating conditions without difficulty.

According to the present invention, a knotting mechanism for use in a baling machine includes a compression spring which acts on the twine retainer so that it may apply increased and decreased loads during bale-forming and knotting respectively, the spring being under control of a loading member having a follower engaging a rotary cam with a driving connection to an input shaft of the knotting mechanism.

The follower may be a roller or sliding surface, and the loading member may be a leaf spring carrying the roller or sliding surface at one end, and engaging an abutment on the frame of the mechanism intermediate its ends. In this case, the other end of the leaf spring is preferably loaded by another compression spring on a pin projecting from the frame and passing through the leaf spring, the pin carrying a wing nut which is adjustable to vary the spring loading.

The compression spring acting directly on the twine retainer may have its tension adjusted by axially adjusting the shaft of the twine retainer.

Further, according to the present invention there is provided a baling machine having knotting mechanism including a frame carrying an input shaft and a twine retainer having two twine clamping parts and spring means urging said parts to a clamping position, and a driving connection between the input shaft and twine retainer, in which one of the parts is fixed to a shaft driven by the input shaft, and the other of the parts is axially movable on the driven shaft, and in which the spring means comprises first and second compression springs and a leaf spring. The first compression spring extends between the axially movable clamping part and one end of the leaf spring, and the second compression spring loads the leaf spring at the other end of the latter, the leaf spring intermediate its ends engaging an abutment on the frame, and at its said one end carrying a cam follower engaging a cam on the input shaft. The cam has a rise which, during a bale forming operation, engages the follower so as to increase the clamping load effected by the first compression spring, and, during knotting, disengages the follower so as to decrease the load.

Figure 2:
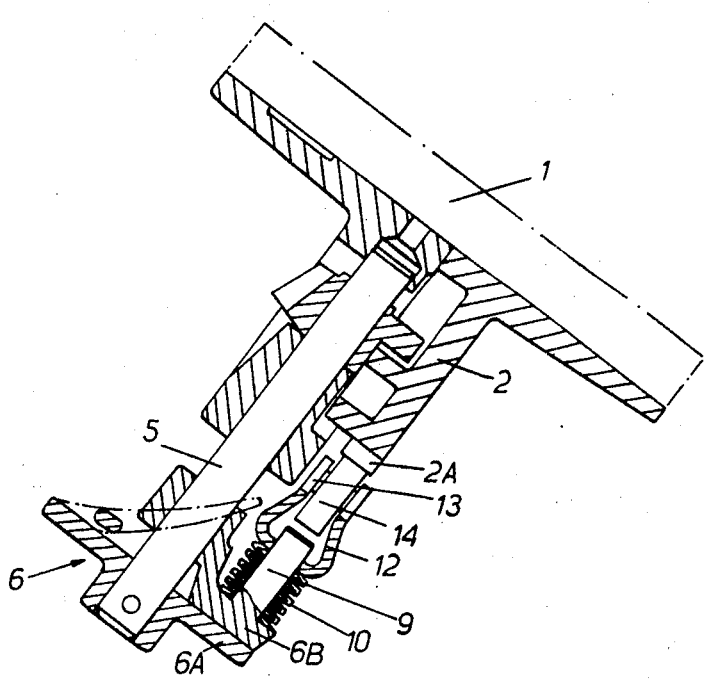
Figure 3:
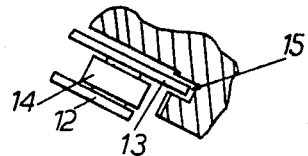

An embodiment of the invention will now be described, by way of example, with reference to the accompanying drawings, in which:

FIG. 1 is a front view of a knotting mechanism according to the present invention, and FIGS. 2 and 3 are respectively sectional views on the lines AB and CD of FIG. 1.

Referring to the drawing, a knotting mechanism has an input shaft 1, a driving disc 2 fixed to the shaft 1 and having gear segments for driving the shaft 3 of a bill hook 4 and a shaft 5 of a twine retainer 6 through gear wheels 7 and 8 respectively.

The twine retainer 6 has two twine clamping parts 6A, 6B, of which the part 6A is secured to the shaft 5, and the part 6B is slideable on the shaft 5. The part 6B has a pin 9 surrounded by a compression spring 10, which bears at its lower end on the part 6B, and one end of a leaf spring 11, through which the pin 9 freely passes, bears on the upper end of the spring 10. At said end of the leaf spring 11, there are two lugs 12, 13, between which a roller 14 is carried, and the lug 13 is guided in a slot 15, FIG. 3, in the frame of the mechanism. At its other end, the leaf spring 11 fits slideably on a pin 16 on said frame. A compression spring 17 surrounds the pin 16 and at one end abuts the adjacent end of the leaf spring 11, and at its other end abuts a wing nut 18 on the pin 16. The roller 14 engages the peripheral face of the disc 2, and the latter is formed as a cam having a rise indicated by the chain-dotted line 2A. Intermediate its ends, the leaf spring 11 engages an abutment 19 on the frame.

During each bale-forming operation, the shaft 1 is at rest, and the compression spring 10 is additionally loaded by the rise 2A in the cam or drive disc 2 and the twine is held securely in the twine retainer 6. Shortly after the shaft 1, and consequently the drive disc 2, begins to rotate during knotting, the roller 14 is disengaged by the rise 2A in the cam, and the compression spring 10, and consequently the twine retainer 6, is only under the load transmitted by means of the leaf spring 11 from the spring 17. The compression spring 17 is adjusted in such a way by means of the wing nut 18 that the twine can be drawn out of the twine retainer 6 during the binding operation without breaking or fraying. After each rotation of the shaft 1 is finished, the cam again additionally tightens the compression spring 10 and consequently the twine retainer 6.

The compression spring is arranged in such a way that it takes up unavoidable tolerances of the structure and unavoidable wear, and so that it, only during the baleforming operation, loads the twine retainer 6 so that the twine is held securely. During each knotting operation, the twine retainer 6 is only loaded by the compression spring 17, and the force of the compression spring 17 is transmitted to the twine retainer 6 via the leaf spring 11 and the compression spring 10.

The relatively low load required during the knotting operation may be easily adjusted by means of only the one wing nut 18.

The cam follower may alternatively be in the form of a sliding surface instead of the roller 14.

Provision is made for axially adjusting the shaft 5 so that the tension in the spring 10 may be adjusted.

We claim:
1. Knotting mechanism for use in a baler comprising a twine retainer having a pair of clamping parts, a spring acting on the twine retainer to urge the clamping parts together, and a loading member interconnected with said spring operable during baling and knotting operations to alternately apply increased and decreased loading to the clamping parts.

2. Knotting mechanism as claimed in claim 1 further including an input shaft, a rotary cam having a driving connection with the input shaft, and wherein said loading member has a follower engaged with said cam such that rotation of the cam causes said alternate increased and decreased loading.

3. Knotting mechanism as claimed in claim 2, in which said loading member is a leaf spring which at one end presses on one end of said compression spring.

4. Knotting mechanism as claimed in claim 3, in which said follower is at said one end of the leaf spring, and the latter intermediate its ends engages an abutment on the frame of the mechanism.

5. Knotting mechanism as claimed in claim 4, in which the other end of the leaf spring is loaded by another compression spring.

6. Knotting mechanism as claimed in claim 5, in which said other compression spring is on a pin projecting from the frame of the mechanism and passing through the leaf spring, and said pin carries a nut which is adjustable so as to vary the spring loading.

7. Knotting mechanism as claimed in claim 6, in which the twine retainer is mounted on a shaft, and the latter is axially adjustable so as to vary the tension on the compression spring pressing on said one end of the leaf spring.

8. A baling machine having knotting mechanism including a frame carrying an input shaft and a twine retainer having two twine clamping parts and spring means urging said parts to a clamping position, and a driving connection between the input shaft and twine retainer, in which one of said parts is fixed to a shaft driven by the input shaft, and the other of said parts is axially movable on said driven shaft, and in which said spring means comprises first and second compression springs and a leaf spring, the first compression spring extending between the axially movable clamping part and one end of the leaf spring, the second compression spring loading the leaf spring at the other end of the latter, the leaf spring intermediate its ends engaging an abutment on the frame, and at its said one end carrying a cam follower engaging a cam on the input shaft, the cam having a rise which, during a bale forming operation, engages the follower so as to increase the clamping load effected by the first compression spring, and, during knotting, disengages the follower so as to decrease said load.

9. A baling machine as claimed in claim 8, in which said second compression spring is on a pin which projects from said frame and passes through said other end of the leaf spring, and said pin carries a nut which is adjustable so as to vary the spring loading.

References Cited

UNITED STATES PATENTS 1,155,860  10/1915  Witte _____ 289—13

FOREIGN PATENTS 872,410  3/1953  Germany.
1,016,447  1/1966  Great Britain.

LOUIS K. RIMRODT, Primary Examiner